United States Patent
Abdelnur et al.

(10) Patent No.: US 6,789,204 B2
(45) Date of Patent: *Sep. 7, 2004

(54) RESOURCE SHARING ON THE INTERNET VIA THE HTTP

(75) Inventors: Alejandro Abdelnur, Sunnyvale, CA (US); Abhay Gupta, Milpitas, CA (US); Brent Callaghan, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 564 days.

This patent is subject to a terminal disclaimer.

(21) Appl. No.: 09/825,165

(22) Filed: Apr. 2, 2001

(65) Prior Publication Data

US 2001/0032320 A1 Oct. 18, 2001

Related U.S. Application Data

(63) Continuation of application No. 09/277,218, filed on Mar. 25, 1999, now Pat. No. 6,212,640.

(51) Int. Cl.$^7$ ................................................ G03F 11/00

(52) U.S. Cl. ........................................ 713/201; 709/229

(58) Field of Search ................................ 713/157, 201; 707/9–10; 709/219, 223, 225–227, 229

(56) References Cited

PUBLICATIONS

Clark, G., Directory Enabled Security SIMC Authorization, Dec. 4th 1998.*

Marshall Kirk McKusick, Keith Bostic, Michael Karels, and John Quarterman, *The Network Filesystem*, Chapter 9, The Design and Implementation of the 4.4BSD Operating System, Addison–Wesley Publishing Company, Inc. (0–201–54979–4) Copyright 1996.

* cited by examiner

*Primary Examiner*—Gilberto Barron
*Assistant Examiner*—Minh Dinh
(74) *Attorney, Agent, or Firm*—Gunnison, McKay & Hodgson, L.L.P.; Philip J. McKay

(57) ABSTRACT

A method and apparatus for sharing resources in a network environment. An application running on a client can access a resource on a remote computer by submitting a request via an Internet browser. The request is analyzed, converted to proper format and is transferred over the network lines to a server that can satisfy the request. For security reasons, an application may not be authorized to submit a request directly to a server on the Internet. If a requesting application has a trusted status, then its request for connecting to the server is granted. If a request submitted by an application to a server is denied, then a server that entrusts the application is identified, and the request is submitted to that server. A program code called a "servlet" is implemented on that server to accept the requests submitted by a trusted application. The submitted requests are analyzed by the servlet and are forwarded to a resource server that can satisfy the requests. A response from the resource server is routed through the servlet back to the requesting application.

39 Claims, 7 Drawing Sheets

RESOURCE SHARING ON THE INTERNET VIA THE HTTP

This is a continuation of application Ser. No. 09/277,218 filed Mar. 25, 1999 now U.S. Pat. No. 6,212,640 Apr. 3, 2001.

BACKGROUND OF THE INVENTION

A. Field of Invention

This invention relates to computer systems, and more specifically to an information sharing environment in a computer network. Portions of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

Sun, Sun Microsystems, the Sun logo, Solaris, "Write Once, Run Anywhere", Java, JavaOS, JavaStation and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

B. Background Art

In computer networks, it is often desirable to share information or services available on one computer ("server") with other computers ("clients") on the network. One area of focus relates to sharing of information over a world wide network of computers known as the Internet or the World Wide Web (WWW). For example, a program (or application) running on a client computer may need to use information available on a remote network, via the Internet.

For security reasons, information communicated over the Internet is shared with trusted applications only. A trusted application is an application that can successfully secure a connection with a network server, after satisfying a series of checks and balances. Typically, an application's access is limited to information that is available on the network server with which it has established a direct communication link. However, sometimes, it is desirable for a client application to access information on a network computer other than the network communication server.

For example, referring to FIG. 1, an employee using his home computer 101 may establish a direct connection via the Internet with an office server 102. As a trusted user, the employee can use information available on server 102. However, for security reasons, he may not be able to use the information on other office computer (e.g., office computer 103) connected to the same network, unless he can successfully establish a direct connection with it. A method is needed to allow a user to securely access information on network computers to which it cannot not directly linked, via the Internet.

The problems involving secure and authorized access to networked computer resources via an Internet connection can be better understood from a review of a general description of network environment, including the Internet, network communication protocols, the Java™ programming language, and the prior art resource sharing schemes.

Networks

In modern computing environments, it is common to employ multiple computers or workstations linked together in a network to communicate between, and share data with, network users. A network can be a small system that is physically connected by cables or via wireless communication (a local area network or "LAN"). Alternatively, several separate networks can be connected together to form a larger network (a wide area network or "WAN"). Other types of networks include the Internet, telcom networks, intranets, extranets, wireless networks, and other networks over which electronic, digital and/or analog data may be communicated.

A network may include resources, such as printers, modems, file servers, etc., and may also provide services such as electronic mail and file sharing. These resources and services are, typically, provided to a plurality of users, or client applications that are authorized to access the network. To access the resources on a network, a client application must successfully authenticate against a network server that acts as a gateway to resources available on that server. However, a client application is, typically, limited to information directly available on the network server. Thus, an application is unable to access the resources available on other network computers, unless it can directly authenticate against them.

The Internet

The Internet is a client/server system that includes a worldwide network of interconnected computers. A "client" is the computer that is used to access the Internet. An Internet client accesses a computer on the network ("server") via an Internet provider. An Internet provider is an organization that provides a client with access to the Internet (via analog telephone line or Integrated Services Digital Network line, for example). Typically, when a user logs onto the Internet or the World Wide Web (WWW), using a client computer, the user views "web pages" that are stored on a remote server. Information including data files, and the web pages are often shared and transferred between the client and the server.

A client may access the resources available on the Internet server, such as shared file systems or printers. Depending on the sensitivity of the resources and the security measures in place, a server evaluates certain information, such as identity of a client, its access rights, and file ownership issues prior to allowing the client to access its resources. One method for sharing resources may be more efficient than another method, depending on the manner the resources are shared.

The components of the Internet include browser software, network links, and servers. The browser software, or browser, is a user-friendly interface that simplifies access to the Internet. A browser allows a client to communicate a request without having to learn a complicated command syntax, for example. A browser typically provides a graphical user interface (GUI) for displaying information and receiving input. Examples of browsers currently available include Netscape Navigator and Internet Explorer.

A browser displays information to a client or user as pages or documents. A language called Hypertext Markup Language (HTML) is used to define the format for a page to be displayed in the browser. A Web page is transmitted to a client as an HTML document. The browser executing at the client parses the document and produces and displays a Web Page based on the information in the HTML document. Consequently, the HTML document defines the Web Page that is rendered at runtime on the browser.

In addition to displaying information, a browser can also retrieve applications or programs from a server to be executed on a client. Typically, an application that runs on a client computer can access the resources of the server that it was retrieved from. However, for security reasons, a client application is not allowed to access the resources of another computer attached to the server, unless it can directly authenticate against it. A method is needed to allow an application to indirectly access resources of computers other than the one it is retrieved from, via the Internet.

Network Communication/Data Transfer

Information servers maintain resources that may be shared through the Internet and are capable of processing a client request to access those resources. To share resources, computers on a network need to be able to communicate with one another. A set of standardized rules, referred to as a "protocol", is utilized to enable computers to communicate.

Communication protocols generally specify the data format, timing, sequencing, and error checking of data transmissions. As a communication network involves numerous layers of operation, various communication protocols are used in the networking environment, as further discussed below.

Transmission Control Protocol/Internet Protocol (TCP/IP)

One communication protocol is referred to as the transmission control protocol/internet protocol ("TCP/IP"). The TCP/IP communication protocol includes a set of communication protocols used on the Internet and on many multi-platform networks.

The TCP/IP protocol family is made up of numerous individual protocols (e.g., file transfer protocol ("FTP"), transmission control protocol ("TCP"), and network terminal protocol ("TELNET")). Using the TCP/IP protocol, information is transmitted in form of messages. The TCP protocol is responsible for breaking up a message into multiple segments, including the segments in packets of manageable size, reassembling the packets at the receiving end, resending any packets that get lost (i.e., are not delivered), and reordering the segments included in the packets in the appropriate format.

A "packet" is an encapsulated form of data or information (also referred to as a "datagram") that is transferred or passed across the Internet according to the communication protocol standards. A packet contains a source and destination address along with the information intended for transmission.

The TCP/IP protocol interfaces with the lower layer network infrastructure responsible for addressing and delivering packets. Other communication protocols such as HTTP/HTTPS, FTP, NFS, etc., provide an interface to higher layers (i.e., application layer) and are referred to as "high level" protocols. High level protocols, typically, define a set of rules for interfacing with network applications and the transmission of information between them. These higher level protocols utilize TCP/IP as the underlying means for communication of information.

To transfer information, a higher level protocol defines a set of commands that one machine sends to another (e.g., commands to specify who the sender of the message is, who it is being sent to, and the content of the message) encapsulated in a series of packets encoded according to the specifications of that communication protocol. Those packets, in turn, are broken up and encapsulated in TCP/IP packets. The packets are transferred across the network to another machine, where the packets are decoded so that the application running on the destination machine can process the information contained therein.

User Datagram Protocol (UDP)

Another transfer protocol that is utilized to control the transfer of information is the user datagram protocol ("UDP"). UDP is designed for applications and data transmissions where sequences of packets do not need to be reassembled at the receiving end. UDP does not keep track of what has been transmitted in order to resend a packet if necessary. Additionally, UDP's header information (information regarding the source and destination and other relevant information) is shorter than the header information utilized in TCP.

TCP and UDP differ in the manner in which they establish a communication link with a destination. To send a message the TCP protocol establishes a communication link between the parties. This link remains open for further transfer of information between the parties, until that link is closed (e.g., similar to a telephone communication). The UDP protocol, however, closes a communication link immediately after the message is sent or received (e.g., similar to a voice mail or a pager service).

Hyper Text Transfer Protocol (HTTP/HTTPS)

Hyper Text Transfer Protocol (HTTP) is an application protocol that is used for communication between an information server and a client browser on the Internet. In this application, HTTP and HTTPS are used interchangeably to refer to the Hyper Text Transfer Protocol and its counterpart HTTPS. HTTPS is the HTTP protocol that implements the Secured Socket Layer (SSL) mechanism that provides means for automated encryption/decryption of messages transported via the HTTP. HTTP has communication methods that identify operations to be performed by a network application (e.g., commands that allow clients to request data from a server and send information to the server).

For example, to submit an HTTP request generated by a client application, the client contacts the HTTP server and transmits the request to the HTTP server. The request contains the communication method requested for the transaction (e.g., GET an object from the server, POST data to an object on the server) and any necessary data. The HTTP server responds to the client by sending a status of the request and/or the requested information. The connection is then terminated between the client and the HTTP server.

A client request therefore, consists of establishing a connection between the client and the HTTP server, performing the request, and terminating the connection. The HTTP server does not maintain any state about the connection once it has been terminated. HTTP is, therefore, a stateless application protocol. That is, a client can make several requests of an HTTP server, but each individual request is treated independent of any other request. The server has no recollection of any previous request.

Internet Applications and Programming Environment

Although Internet applets or application can be developed and executed in any Internet programming environment, they have been described here, by way of example, in connection with the Java language and programming environment.

Java is an object-oriented programming language with each program comprising one or more object classes and interfaces. Unlike many programming languages in which a program is compiled into machine-dependent, executable program code, classes written in the Java programming language are compiled into machine independent bytecode class files. Each class contains code and data in a platform-independent format called the class file format. A bytecode includes a code that identifies an instruction (an opcode) and none or more operands to be used in executing the instruction. The computer system acting as the execution vehicle contains a program called a virtual machine, which is responsible for executing the code (i.e., bytecode) in Java programming language class files.

Client applications may be designed as standalone Java applications, or as Java "applets" which are identified by an applet tag in an HTML document, and loaded by a browser application. The class files associated with an application or applet may be stored on the local computing system, or on a server accessible over a network. Each Java programming language class file is loaded into the Java virtual machine, as needed, by the "class loader."

To provide a client with access to class files from a server on a network, a web server application is executed on the server to respond to HTTP requests containing URLs (Universal Resource Locators) to HTML documents, also referred to as "web pages." When a browser application executing on a client platform receives an HTML document (e.g., as a result of requesting an HTML document by forwarding a URL to the web server), the browser application parses the HTML and automatically initiates the download of the specified bytecode class files when it encounters an applet tag in the HTML document.

The classes of a Java applet are loaded on demand from the network (stored on a server), or from a local file system, when first referenced during the Java applet's execution. The virtual machine locates and loads each class file, parses the class file format, allocates memory for the class's various components, and links the class with other already loaded classes. This process makes the code in the class readily executable by the virtual machine. Native code, e.g., in the form of a dynamic linked library (DLL), is loaded when a Java programming language class file containing the associated native method is instantiated within the virtual machine.

A Java applet loaded from the network server is executed on the client's virtual machine. An applet has limited permission to access the resources available on the server and other network computers. In prior art schemes, this access is typically limited to the resources available on the server where the applet is loaded from. This is because an applet retrieved from a server has a trusted status with that server. A trusted applet is one that can directly connect to a server computer. However, due to security issues, such as firewalls and the limitations associated with the browser architecture, an applet cannot directly access information on other computers on the network by which it is not trusted.

FIG. 1 is a block diagram of a client/server system connected via the Internet. Client application 101 can be an application or applet downloaded from office server 102, via the Internet connection, onto a user's home computer. Typically, applications downloaded from a server are trusted by that server. Thus, client application 101 can access the resources available on office server 102.

It may be desirable for client application 101 to access the resources available on other computers on the office network, such as office computers 103, 104, or 105. However, client application 101 may not be entrusted by those network computers. As a result it cannot directly authenticate against those computers and hence cannot access information available thereon. Current methods do not provide for any means by which an application can access resources on a network computer, via the Internet, unless it can directly authenticate against it. A method is needed to allow an application, trusted to a first computer on a network, to indirectly communicate with other network computers, via the Internet.

The Network File System (NFS)

A distributed file system provides for the sharing of files and information located on computer systems geographically separated but functionally linked together in a communications network. The Network File System or NFS was developed by Sun Microsystems and an example of a distributed file system protocol that allows a computer on a network to use the files and peripherals of another networked computer (remote computer) as if they were local to that computer. NFS operates as a client server application. An NFS server is a computer that shares its resources with other computers (NFS clients) on the network, using the NFS service.

Using NFS, a resource (i.e., software) physically linked to a NFS server may be "NFS mounted." The resource that is "NFS mounted" is accessible to all NFS clients as if the software were stored locally at each client. This is accomplished by a system of tables (mount tables) identifying the mounted resource and the appropriate path names to the NFS server where the resources resides. The NFS system can also be used to locate a designated resource so that it can be accessed from a remote location.

The NFS system generated mount table is stored as a file on each server and client in the NFS network. The mount table consists of a list of entries. When a new resource is mounted, a new entry is generated in the table automatically and is used to locate the resource whenever a request for access to that resource is made by a client.

FIG. 2 is a block diagram illustrating the components of an NFS system and the interrelationship between those components. An NFS system includes application 210 running on NFS client 230, and NFS server 260 that provides access to file system 270 through network 250. Application 210 interfaces via input/output application programming interface (IO API) 220 with NFS client 230. An API is a software program that an application uses to request and carry out lower level services (e.g., initiating network communication) performed by a client computer's operating system.

Application 210 may need to access information stored on remote file system 270, accessible via NFS server 260. Using NFS, application 210 makes a request for a procedure to be performed, (e.g., a read or write request) as if it is making a local procedure call. A local procedure call includes pointers to the locations where data to be processed is stored and is typically in binary format.

While application 210 is waiting for a response to its request, NFS client 230 encodes the contents of the local request into a remote-procedure-call (RPC). An RPC is a message that contains the contents of the local request in converted form, so that it is transferable via communication link 240. A local request is transformed into a RPC request, after it is converted from binary form into network byte format. Each RPC request may need to be broken into multiple packets and embedded in lower level protocols before it is transferred over communication link 240 via the TCP/IP or UDP protocols. Communication link 240 may be established via electrical, electromagnetic or optical signals which carry digital data.

Once NFS server 260 receives a RPC request from NFS client 230, the request is decoded and processed as a local file system operation. The result generated by NFS server 260 is encoded and returned to NFS client 230, where it is further processed and delivered to application 210, as though the result were being returned from a local procedure call.

A user may utilize NFS to obtain information about or modify attributes of a file stored in a remote file system. For example, a user may look up a file name stored at a remote location, and may create, delete, read from and/or write to a file, as if it is managing a file stored at the local computer system. Each file accessed on the remote server is identified by a unique file handle. A file handle is the token by which NFS clients refer to files on an NFS server. Handles are globally unique and are passed in operations, such as read and write, that reference a file. A file handle is created by the NFS server when a request referencing a file is made by an NFS client.

The NFS protocol is stateless, meaning that NFS server does not maintain information about the clients it is serving or about the files that are currently accessed by the clients. Thus, each submitted request by an NFS client to an NFS server must be self-contained (i.e., each request must include all information, such as the file name, file location, and permissions, necessary to access a file). For a detailed study of the Network File System please refer to "The Design and Implementation of the 4.4BSD Operating System" by Marshall K. McKusick, Addison-Wesley Publishing Company, Inc., (1996), incorporated by reference herein.

WebNFS

A distributed file system may be implemented for sharing files and information located on computer systems functionally linked together via the Internet. Web Network File System or WebNFS, also developed by Sun Microsystems, allows a computer to use the files and peripherals of another computer, using the Internet as the means of communication.

FIG. 3 is a block diagram of a WebNFS system illustrating the components of the system and the manner they interact. It includes application 310, NFS client 330, NFS server 360, and file system 370 in network 350. Application 310 interfaces via IO API 320 with NFS client 330. Application 310 can request access to information stored on remote file system 370, by identifying the uniform resource locator (URL) designation for that resource on the NFS server 360.

WebNFS is a Java implementation of an NFS client. Thus, it is machine independent. NFS client 330, acting as the execution vehicle for WebNFS program code, utilizes Java virtual machine 335. The advantage of Java virtual machine 335 is that it can provide an execution environment for the WebNFS program to run on any platform (i.e. UNIX, personal computers, mainframes, etc.).

Using WebNFS, NFS client 330 makes a request for a procedure to be performed as if it is making a local procedure call. The request is converted into an RPC request by NFS client 330. RPC request is sent embedded in the underlying communication protocols TCP/IP or UDP packets to NFS server 360 via communication link 340. NFS client 330 is responsible for converting IO requests to TCP/IP or UDP packets that are understandable by NFS server 360.

The WebNFS program is executed on NFS server 360 to respond to the RPC requests submitted by NFS client 330. When an NFS request is made, NFS server 360 finds the file for which the request was made and verifies whether requesting application 310 has permission to access file system 370. If permission is granted, NFS server 360 returns a file handle to NFS client 330 through communication link 340, so that the client can access file system 370. In this manner NFS server 360 responds to requests received from NFS client 330, via the Internet.

An application retrieved from the network onto a NFS client can also send or receive information to or from designated resources on an NFS server. However, due to security issues, an application's access to resources on an Internet server is limited. For example, an application may be unable to retrieve information from a computer other than the one from which it was retrieved.

Digital Signature System

One security approach that allows applications or applets to access information on computers other than the one they have been retrieved from uses digital signatures or other forms of certification to confirm that an applet is a trusted applet. For example a digital signature or an authorization certificate from a trusted authority can be included in an applet for verification purposes. A server that the applet seeks to access can determine the authenticity of the applet by verifying the applet's digital signature using a public key/private key encryption technique.

There are disadvantages associated with this scheme. To support digitally signed applets, it is necessary for the client and the server to include the ability to verify the digital signature. For example, the parties to the communication need to have a certification infrastructure to validate an applet's signature. Further, inclusion of a signature mechanism in the applet can make the applet's byte code undesirably lengthy, and can adversely affect the performance of the applet. Hence, signed applet support is not provided by all clients or servers.

Another digital signature system method requires the inclusion of a certification infrastructure in the browser application where an applet operates. However, many currently available browsers do not include this capability either. Thus, a method is needed to allow an application to access resources on computers other than the one it is retrieved from without the need for inclusion of a signature system in the client or the server.

SUMMARY OF THE INVENTION

A method and apparatus for sharing resources in a network environment using the HTTP/HTTPS protocol is described. Typically, a computer linked to the Internet may have resources or may provide services, such as file sharing or printing services, that are usable by other computers linked to the Internet. A user, using one or more embodiments of the invention, can access those resources or services as if they were locally situated.

In embodiments of the invention, an application running on a client can access a resource on a remote computer by submitting a request via an Internet browser. The request is analyzed and converted to proper format (i.e. a local request is converted into a remote call request) and is transferred over the network lines to a server that can satisfy the request.

For security reasons, an application may not be authorized to submit a request directly to a server on the Internet. For example, limitations have been implemented that prohibit a requesting application from obtaining access to resources of a server computer unless that application is a trusted application. A trusted application is an application that has been classified as having permission to establish a connection with a certain computer. In embodiments of the invention, if a requesting application has a trusted status, then its request for connecting to the server is granted.

If for security reasons a request submitted by an application to a server is denied, in embodiments of the invention, a server that entrusts the application is identified, and the request is submitted to that server. A program code called a "servlet" is implemented on that server to accept the requests submitted by a trusted application. The submitted requests are analyzed by the servlet and are forwarded to a second server ("resource server") that can satisfy the requests. A response from the resource server is routed through the servlet back to the requesting application.

The servlet is configured such that it has the capability and the permission to communicate with the resource server on behalf of the requesting application. Consequently the servlet acts as an intermediary between the application and the resource server for exchange of requests and responses, such that the servlet is transparent to the requesting application and the resource server.

DETAILED DESCRIPTION OF THE INVENTION

Figure 1:
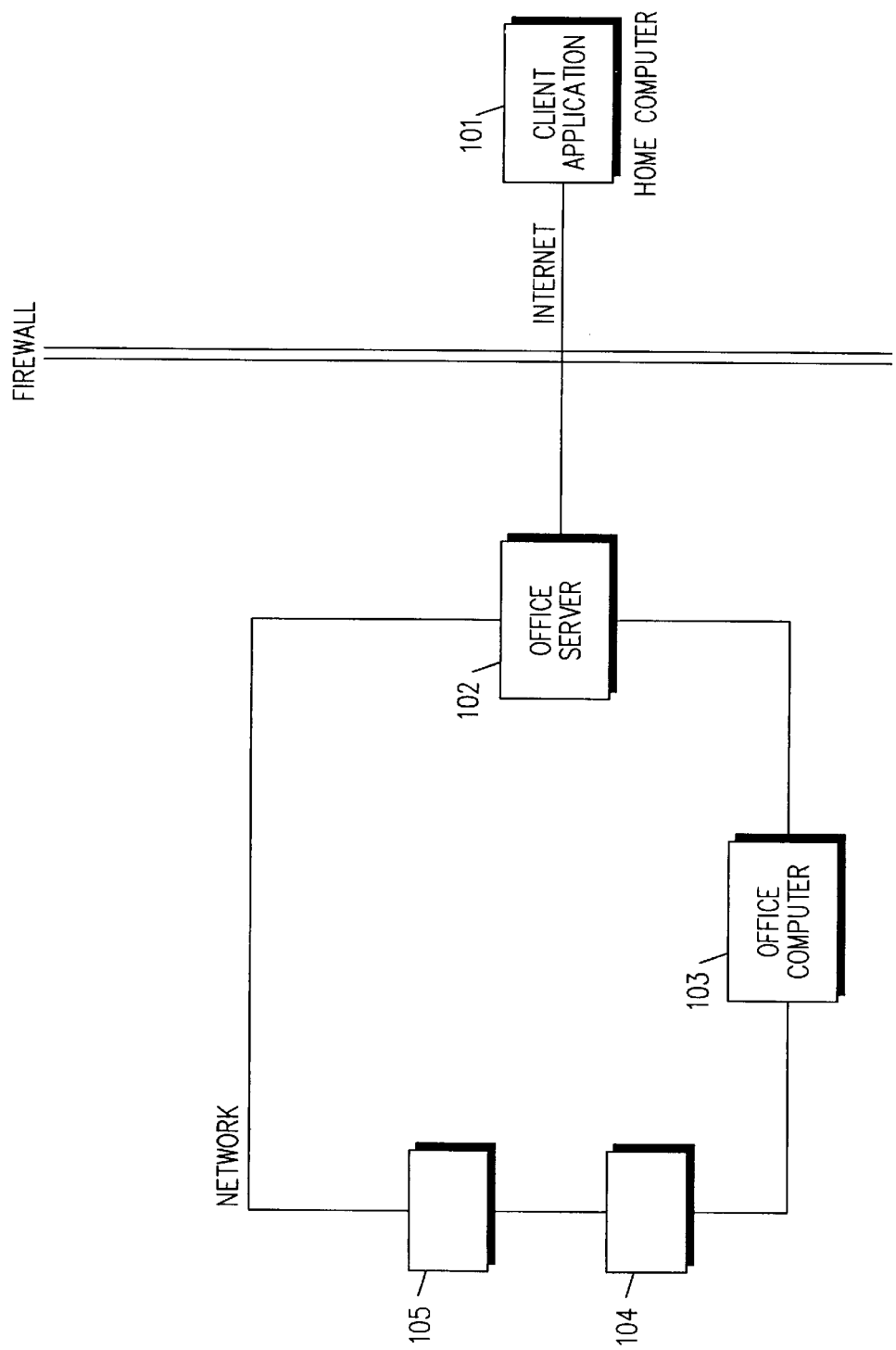
FIG. 1 is a block diagram of a client/server system connected via the Internet.
Figure 2:
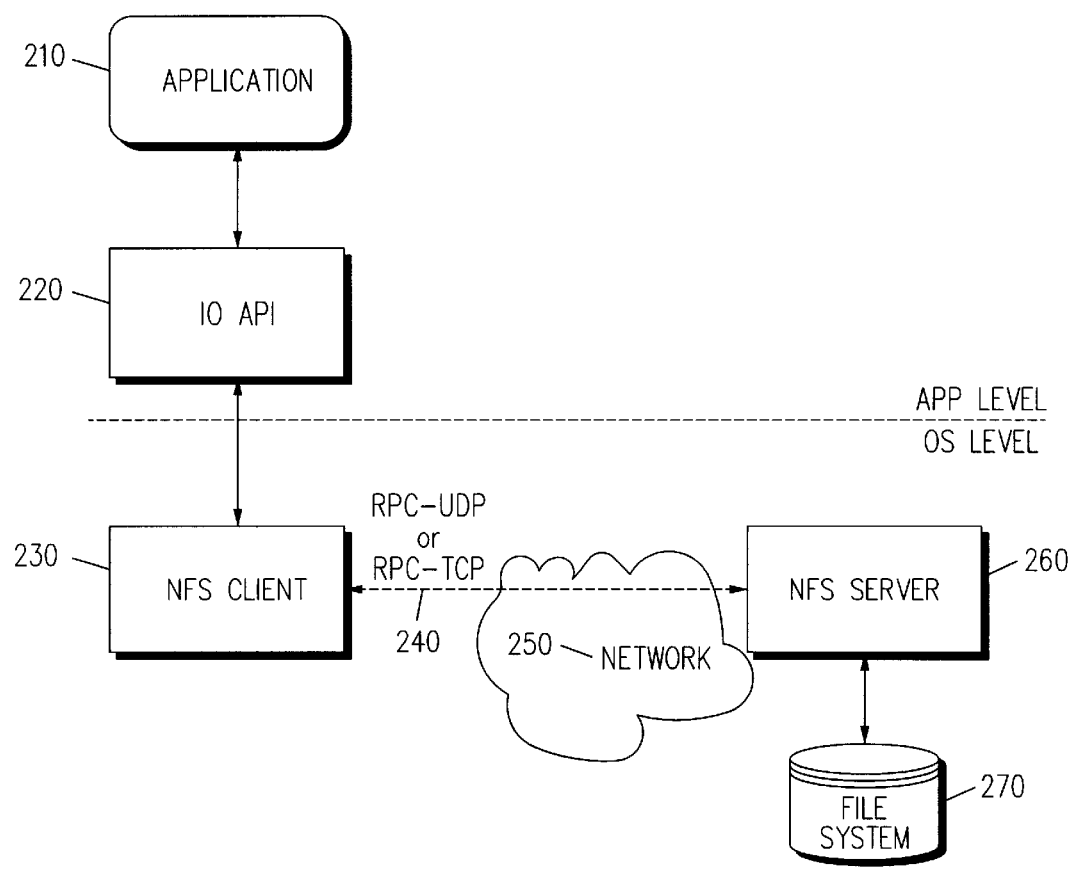
FIG. 2 is a block diagram of an NFS system illustrating the components of the system and the manner they interact.
Figure 3:
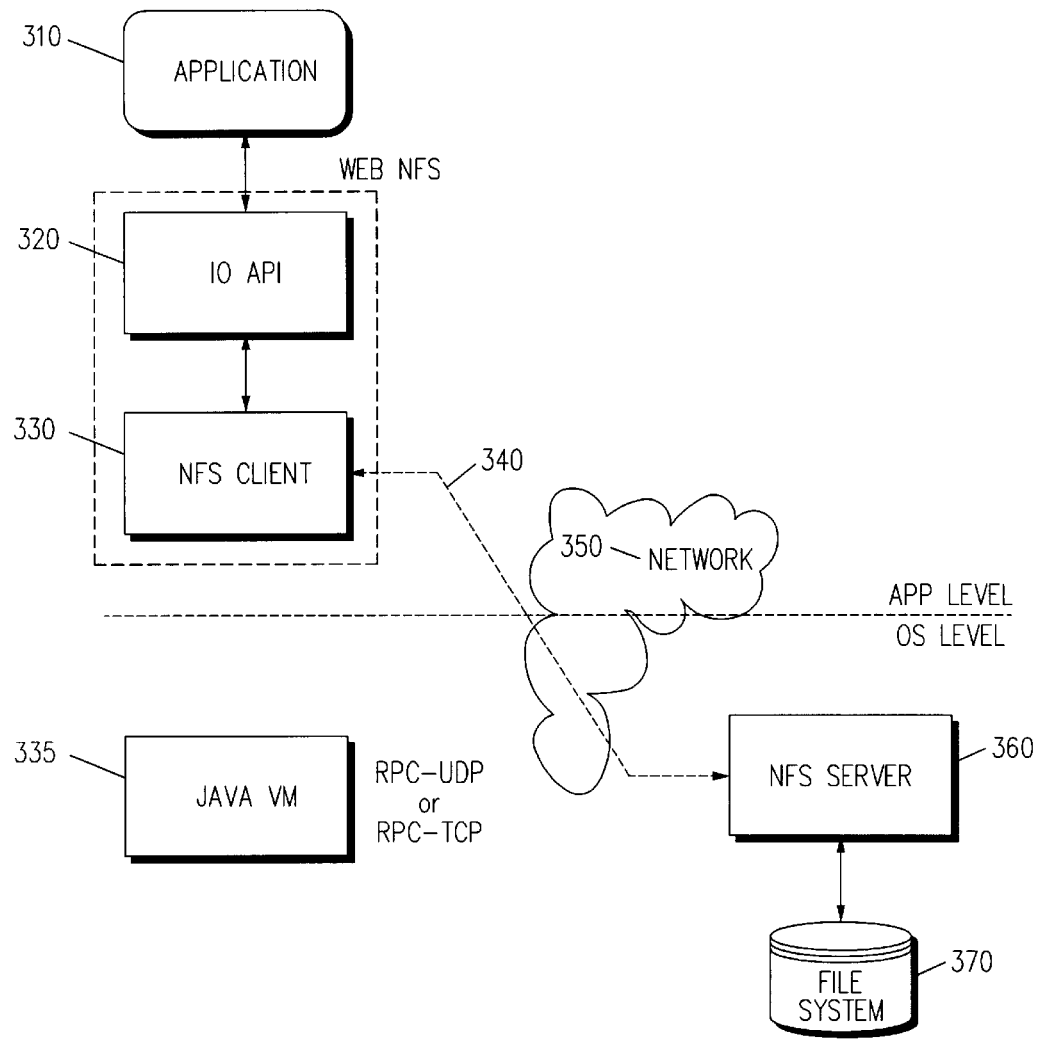
FIG. 3 is a block diagram of a WebNFS system illustrating the components of the system and the manner they interact.

A method and apparatus for resource sharing in a network environment using the HTTP/HTTPS protocol is described. In the following description, numerous specific details are set forth in order to provide a more thorough understanding of the present invention. It will be apparent, however, to one skilled in the art that the present invention may be practiced without these specific details. In other instances, well-known features have not been described in detail not to unnecessarily obscure the invention.

Further, this invention is described in connection with accessing resources available on remote servers, utilizing the Network File System (NFS) service. However, this is by way of example only. The invention has equal application to any service that can provide access to resources in a computer system, particularly in a network environment. Thus, the invention is not limited to accessing file systems on remote computers, but has equal application to various forms of sharable resources, for example, printers, scanners, network modems, etc.

A. HTTP/HTTPS Tunneling Using Servlets

Embodiments of the invention implement a network environment that allows for applications retrieved from one network server to access resources available on other servers on the network. A client using a browser interacts with a server and retrieves applications or applets from that server. These applications and applets can access resources of a server as long as they meet two conditions. First, the application needs to be able to authenticate against a server. Second, the application needs to have the required access rights to use the resources available on that server.

Authentication involves submission of data (i.e., user names, passwords, etc.) from a client application to a server, verification of this information by the server, and establishment of a successful connection (i.e., communication link) between the two. Applications that can successfully authenticate against a server are said to be "trusted" applications with that server. Typically, an application downloaded or retrieved from a server is entrusted by that server.

For example, a client application may successfully authenticate with a server that contains resources such as e-mail services, printing resources, and other shared networked peripherals. However, the application's access rights may be limited (e.g., by the network administrator, or the application's programmer) to using the e-mail services only. Thus, while a client application may be able to successfully authenticate against a server, it may not have the permission to use all the resources available on that server.

The opposite can be also true. While an application may have the access rights to use a resource on a server, it may be unable to successfully authenticate against that server. For example, an application retrieved from a main network server may have access rights to all resources on that network, including resources available on computers other than the server. But due to network security schemes (i.e., firewalls) and safety measures embedded in the browser architecture, the application may not be able to authenticate against a computer where a desired resource resides. Thus while the aforesaid safeguards are helpful to protect a network's resources from unauthorized access, they are also limiting and undesirable where they prohibit an application from accessing resources that are otherwise available to it.

Figure 4:
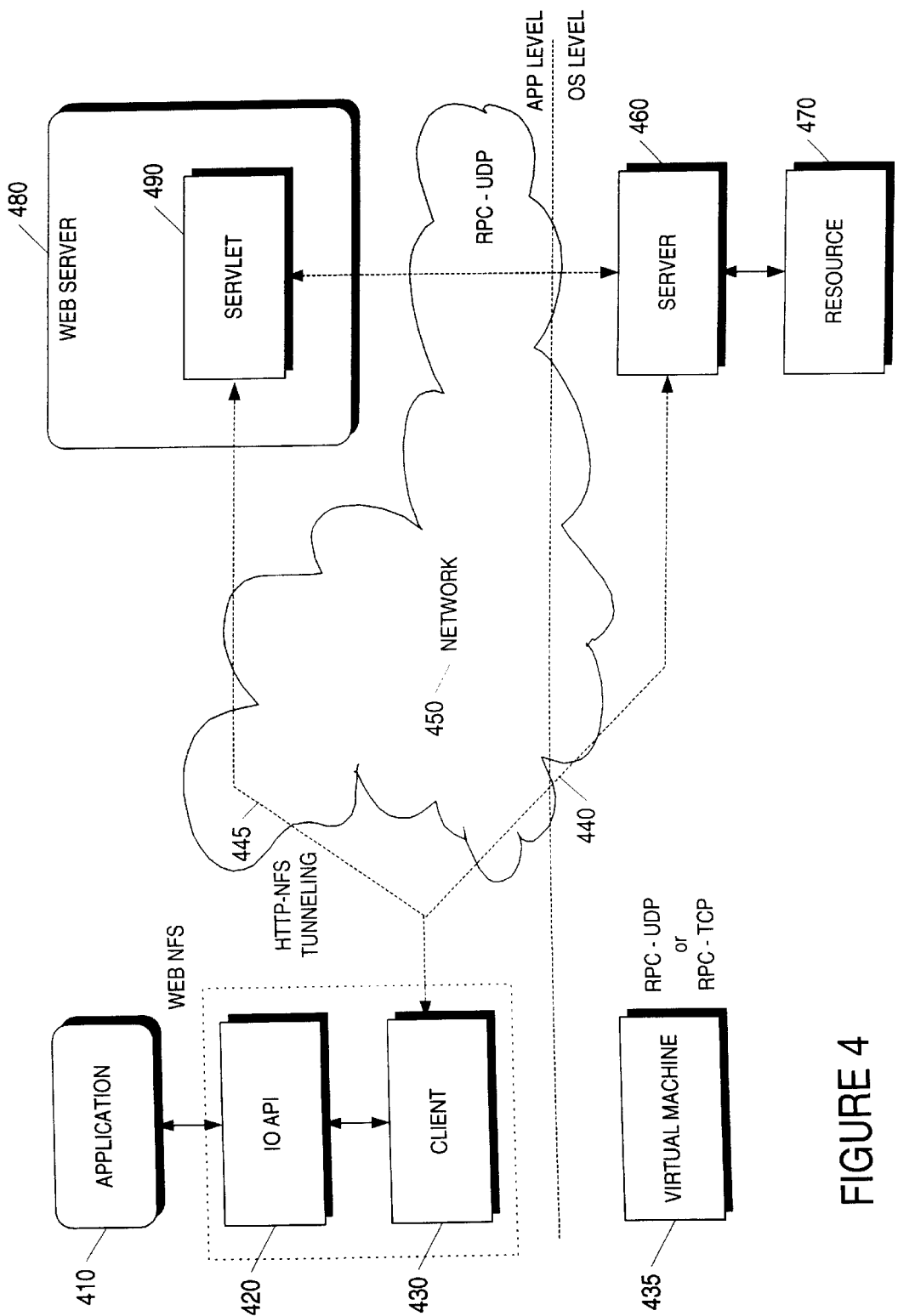
FIG. 4 is a block diagram illustrating the various components of one or more embodiments of the invention.

Embodiments of the invention provide an environment in which an application can indirectly access services or resources available on servers that it cannot directly authenticate against. FIG. 4 is a block diagram illustrating the various components of one or more embodiments of the invention. Accordingly, the invention comprises application 410, client 430, communication links 440 and 445, network 450, server 460, resource 470, and web server 480.

Client 430 includes a browser within which application 410 is executed. Application 410 can be retrieved from a server, such as web server 480, when the browser parses a document written in HTML or other languages (e.g., VRML, XML, SGML, etc.) identified on web server 480, for example. Application 410 is a trusted application to web server 480, such that it can successfully establish communication link 445 with web server 480 and can access its resources.

In addition to resources available on web server 480, application 410 may also need to access resources available on other servers on network 450, such as server 460. To access those resources (i.e., resource 470) application 410 needs to submit a request to the server that is linked to those resources. In embodiments of the invention, requests submitted by application 410 are processed and sent through client 430. Client 430 acts as the execution vehicle for application 410 and may contain virtual machine 435. Virtual machine 435 is able to provide a level of abstraction and an independent execution environment for application 410 so that it can run on any platform such as UNIX, Windows, or other operating systems.

Figure 5:
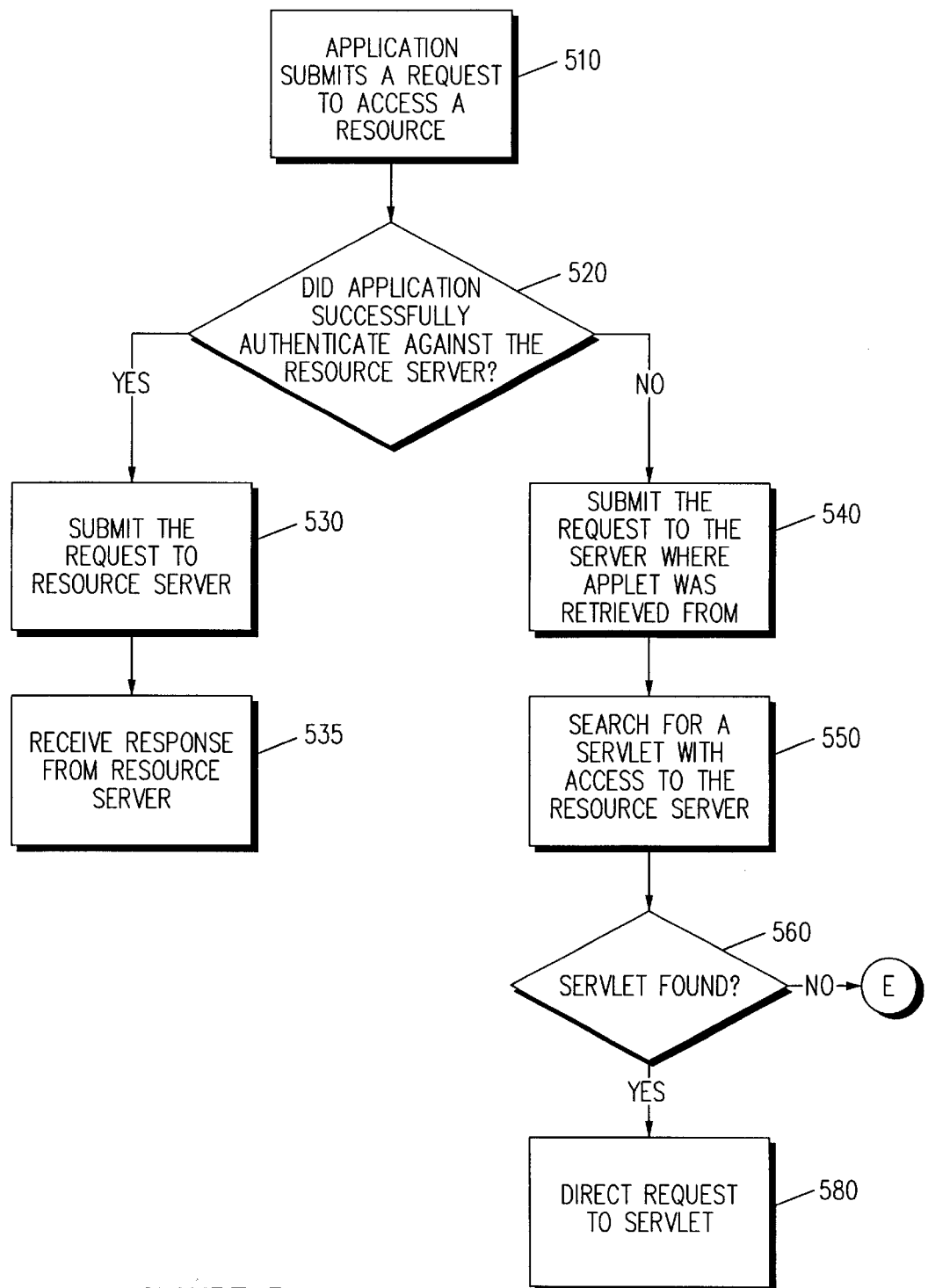
FIG. 5 is a flow diagram illustrating a method for accessing resources located on a remote computer, according to one or more embodiments of the invention.

FIG. 5 is a flow diagram illustrating a method by which application 410 submits a request to resource server 460, according to one or more embodiments of the invention. At step 510, application 410's request is submitted to resource server 460, after being converted to the proper format by client 430. At step 520, it is determined whether application 410 is a trusted application to server 460. If so, application 410 establishes communication link 440 with server 460, and at step 530 application 410's request for access to resource 470 is submitted to server 460, using either the UDP or the TCP protocol. Once application 410's request is processed by server 460, at step 535, client application 410 receives a response from server 460, via communication link 440.

If at step 520 application 410 fails to successfully authenticate against resource server 460 (i.e., because it was not retrieved from that server), then it cannot directly submit the request to server 460. Hence, an alternate route is needed so that application 410 can indirectly access resource 470. In one or more embodiments of the invention, at step 540, client 430 identifies web server 480, the server against which application 410 can successfully authenticate (i.e., the server from which application 410 was retrieved), and submits the request to that server, via communication link 445, using the HTTP/HTTPS protocol.

Web server 480 is a gateway on network 450 that can indirectly route application 410's requests to server 460. Since application 410 is a trusted application, it can successfully submit its requests to web server 480. Additionally, since web server 480 and resource server 460 are both members of network 450, the two servers can communicate free from any limitations. These communication limitations can be, generally, imposed by network 450's firewall security measures or the browser's access constraints, developed to prohibit unauthorized access by external entities to network 450.

Requests submitted by application 410 to web server 480 are processed by servlet 490. Servlet 490 is a program code that can be written in the Java programming language, or other programming languages, and can access a resource server that can satisfy application 410's request. Servlet 490 can be invoked by application 410 via a name or a URL, for example. In one or more embodiments of the invention, based on the type and the nature of requests submitted by application 410, at step 550, a search is performed to locate servlet 490.

At step 560, it is determined whether servlet 490 is found on web server 480. If servlet 490 is not found then an error occurs. This error is processed at step E (i.e., the user or the application is notified that the request cannot be processed, because access to the resource has been denied). Alternatively, if servlet 490 is found, then at step 580 the request submitted by application 410 is directed to servlet 490. Servlet 490 acts as a proxy by routing requests and responses between application 410 and server 460.

Figure 6:
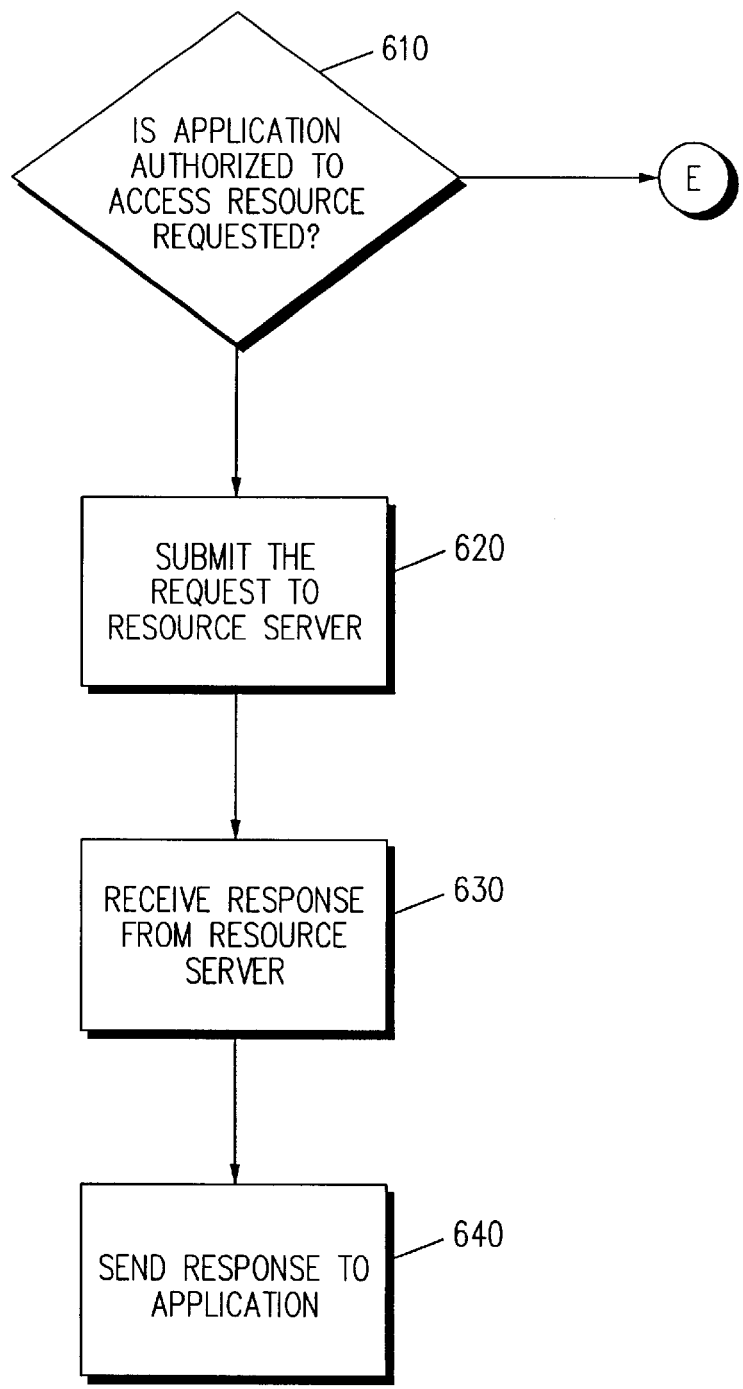
FIG. 6 is a flow diagram illustrating the manner in which a servlet routes requests and responses between a client application and a resource server, according to one or more embodiments of the invention.

For example, one of servlet 490's function is to act as a conduit (or a "tunnel") between client application 410 and server 460. FIG. 6 is a flow diagram illustrating the manner in which servlet 490 operates, according to one or more embodiments of the invention. At step 610, the request submitted by application 410 is processed by servlet 490 to determine whether application 410 is authorized to access resource 470, as requested. This authorization is typically based on application 410's access rights, as decided by the programmer of the application, for example.

If application 410 does not have the required permission to access resource 470 on server 460, then an error occurs indicating to the user or application 410 that the request cannot be processed, because access to the resource has been denied. However, if the authorization process is successful, then at step 620 application 410's request is submitted to resource server 460 by servlet 490, after it has been converted to the proper format (e.g., into an RPC call). Security measures have been established such that servlet 490 is a trusted entity to server 460, and therefore it can freely contact server 460 or access its resources.

Once the request is processed by server 460, at step 630, servlet 490 receives a response from server 460. At step 640, the response is forwarded to application 410. In one or more embodiments of the invention, servlet 490 can be implemented to limit or prohibit application 410's access to resources that are available through web server 480. For example, a network administrator may configure servlet to 490 route some but not all requests submitted to it by application 410, depending on application 410's access rights.

In one or more embodiments of the invention, servlet 490 provides an additional level of security by embedding into a submitted request, identification information or credentials for a client application. Hence, credentials submitted by the client application are ignored and replaced by the ones assigned by servlet 490. For example, servlet 490 can replace any user credentials submitted by application 410, by a set of identification information previously programmed into servlet 490. Each user request can be identified by servlet 490 and assigned credentials previously classified for that user. This scheme prohibits malicious client applications from breaching network security by submitting false credentials.

In embodiments of the invention, the identity and the credentials of a user making an HTTP/HTTPS request is verified via the Cookie protocol, as HTTP and HTTPS protocols are stateless in nature.

B. Embodiment of Computer Execution Environment (Hardware)

Figure 7:
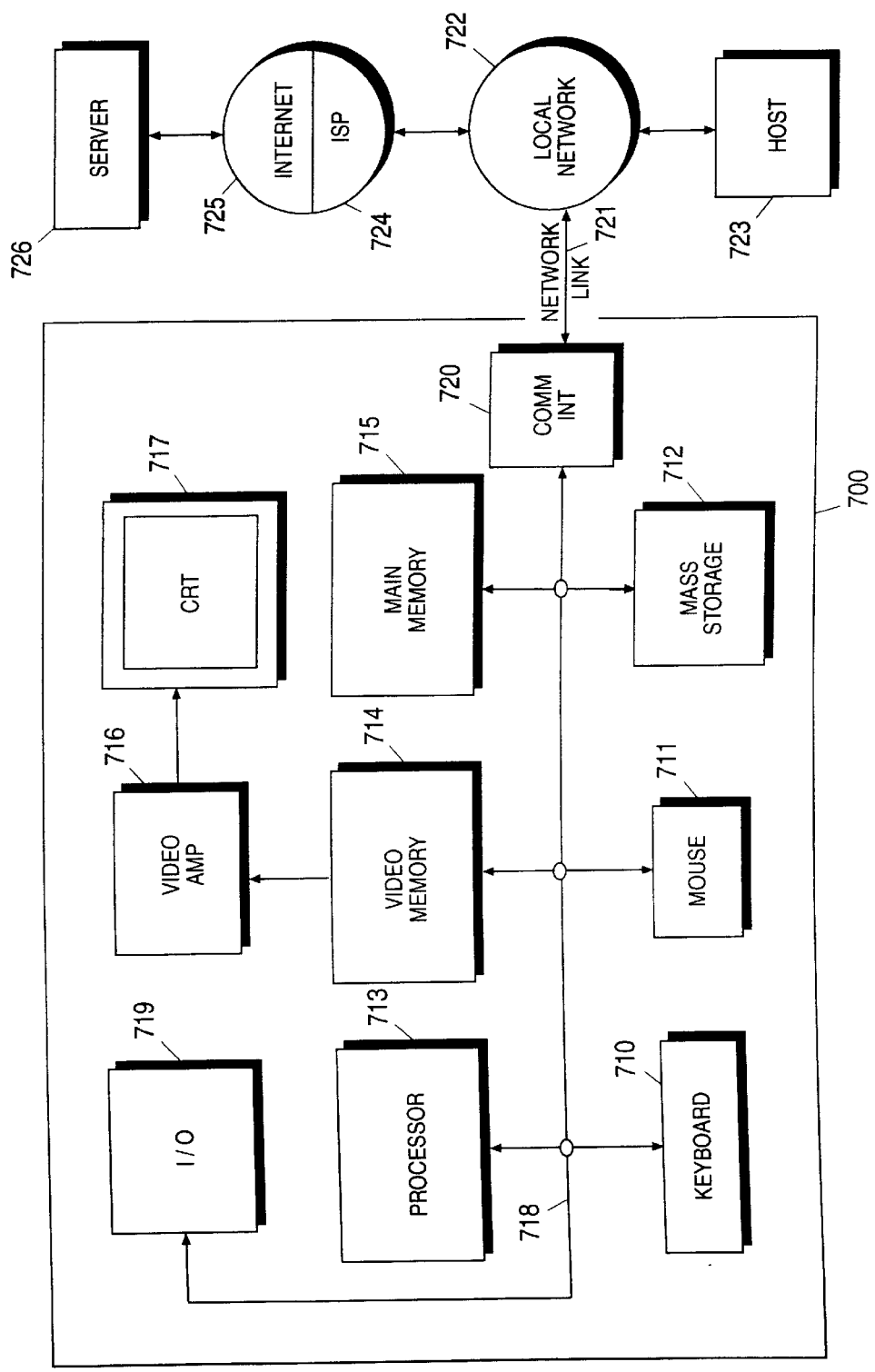
FIG. 7 is a block diagram illustrating an embodiment of a computer execution environment in a general purpose computer, according to an embodiment of the invention.

An embodiment of the invention can be implemented as computer software in the form of computer readable program code executed on a general purpose computer such as computer 700 illustrated in FIG. 7, or in the form of byte code class files executable by a virtual machine running on such a computer. A keyboard 710 and mouse 711 are coupled to a bi-directional system bus 718. The keyboard and mouse are for introducing user input to the computer system and communicating that user input to central processing unit (CPU) 713. Other suitable input devices may be used in addition to, or in place of, the mouse 711 and keyboard 710. I/O (input/output) unit 719 coupled to bi-directional system bus 718 represents such I/O elements as a printer, A/V (audio/video) I/O, etc.

Computer 700 includes a video memory 714, main memory 715 and mass storage 712, all coupled to bi-directional system bus 718 along with keyboard 710, mouse 711 and CPU 713. The mass storage 712 may include both fixed and removable media, such as magnetic, optical or magnetic optical storage systems or any other available mass storage technology. Bus 718 may contain, for example, thirty-two address lines for addressing video memory 714 or main memory 715. The system bus 718 also includes, for example, a 64-bit data bus for transferring data between and among the components, such as CPU 713, main memory 715, video memory 714 and mass storage 712. Alternatively, multiplex data/address lines may be used instead of separate data and address lines.

In one embodiment of the invention, the CPU 713 is a SPAR™ microprocessor from Sun Microsystems, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and may be implemented by any suitable apparatus. This circuitry converts pixel data stored in video memory 714 to a raster signal suitable for use by monitor 717. Monitor 717 is a type of monitor suitable for displaying graphic images.

Computer 700 may also include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Wireless links are also possible. In any such implementation, communication interface 720 sends and receives electrical, electromagnetic or optical signals which carry digital data links representing various types of information.

Network link 721 typically provides data communication through one or more networks to other data devices. For example, network link 721 may provide a connection through local network 722 to host computer 723 or to data equipment operated by an Internet Service Provider (ISP) 724. ISP 724 in turn provides data communication services through the world wide packet data communication network now commonly referred to as the "Internet" 725. Local network 722 and Internet 725 both use electrical, electromagnetic or optical signals which carry digital data links. The signals through the various networks and the signals on network link 721 and through communication interface 720, which carry the digital data to and from computer 700, are exemplary forms of carrier waves transporting the information.

Computer 700 can send messages and receive data, including program code, through the network(s), network link 721, and communication interface 720. In the Internet example, server 726 might transmit a requested code for an application program through Internet 725, ISP 724, local network 722 and communication interface 720. In accord with the invention, one such downloaded application is the method and apparatus for secure transfer of data links described herein.

The received code may be executed by CPU 713 as it is received, and/or stored in mass storage 712, or other non-volatile storage for later execution. In this manner, computer 700 may obtain application code in the form of a carrier wave.

The computer systems described above are for purposes of example only. An embodiment of the invention may be implemented in any type of computer system or programming or processing environment.

Thus, a method and apparatus for resource sharing in a network environment using the HTTP/HTTPS protocol has been described in conjunction with one or more specific embodiments. The invention is defined by the claims and their full scope of equivalents.

What is claimed is:

1. A method for accessing resources on a network server comprising:
   sending a request for access to a first server for at least one resource on said first server;
   authenticating said request for access by said first server;
   receiving access to said at least one resource from said first server if said authenticating is successful;
   receiving access to said at least one resource on said first server through a second server if said authenticating is unsuccessful, wherein said second server has access to said at least one resource on said first server.

2. The method of claim 1, wherein said request for access originates from an application.

3. The method of claim 2, wherein said receiving access through said second server comprises:
   submitting said request for access to said second server for said at least one resource on said first server;
   forwarding said request for access from said second server to said first server;
   receiving from said first server access to said at least one resource by said second server;
   forwarding to said application said access to said at least one resource on said first server by said second server.

4. The method of claim 2, wherein said second server comprises a servlet with access to said first server's resources.

5. The method of claim 2, wherein said application comprises an applet.

6. The method of claim 5, wherein said applet originates from said second server.

7. The method of claim 2, wherein said receiving access through said second server further comprises locating a servlet with access to said at least one resource of said first server.

8. The method of claim 3, further comprising sending an error message to said application if said locating a servlet fails.

9. The method of claim 1, wherein said request for access is submitted using an NFS communication model.

10. The method of claim 1, wherein said request for access is submitted via the HTTP/HTTPS communication protocol.

11. The method of claim 4, further comprising said servlet modifying said application's scope of access to said at least one resource on said first server.

12. The method of claim 1, wherein said authenticating said request is successful if an application was retrieved from said first server.

13. The method of claim 4, wherein said servlet returns an error message to said application if said application is not authorized to access said at least one resource on said first server.

14. A computer program product comprising:
   a computer usable medium having computer readable program code embodied therein for accessing resources on a network server, said computer program product comprising computer readable code configured to cause a computer to:
   send a request for access to a first server for at least one resource on said first server;
   authenticate said request for access by said first server;
   receive access to said at least one resource from said first server if said authenticate is successful;
   receive access to said at least one resource on said first server through a second server if said authenticate is unsuccessful, wherein said second server has access to said at least one resource on said first server.

15. The computer program product of claim 14, wherein said request for access originates from an application.

16. The computer program product of claim 15, wherein said receive access through said second server comprises computer readable code configured to cause a computer to:
   submit said request for access to said second server for said at least one resource on said first server;
   forward said request for access from said second server to said first server;
   receive from said first server access to said at least one resource by said second server;
   forward to said application said access to said at least one resource on said first server by said second server.

17. The computer program product of claim 15, wherein said second server comprises a servlet with access to said first server's resources.

18. The computer program product of claim 15, wherein said application comprises an applet.

19. The computer program product of claim 18, wherein said applet originates from said second server.

20. The computer program product of claim 15, wherein said receive access through said second server further comprises computer readable code configured to cause a computer to locate a servlet with access to said at least one resource of said first server.

21. The computer program product of claim 20, further comprising computer readable code configured to cause a computer to send an error message to said application if said locating a servlet fails.

22. The computer program product of claim 14, wherein said request for access is submitted using an NFS communication model.

23. The computer program product of claim 14 wherein said request for access is submitted via the HTTP/HTTPS communication protocol.

24. The computer program product of claim 17, further comprising said servlet modifying said application's scope of access to said at least one resource on said first server.

25. The computer program product of claim 14, wherein said authenticate said request is successful if an application was retrieved from said first server.

26. The computer program product of claim 17, wherein said servlet returns an error message to said application if said application is not authorized to access said at least one resource on said first server.

27. A system for accessing resources on a network server comprising:
   a first server having at least one resource;
   a client configured to require access to said at least one resource, said client sending a request for access to said first server for said at least one resource, said first server authenticating said request for access, said client receiving access to said at least one resource from said first server if said authenticating is successful;
   a second server having access to said at least one resource on said first server, said client receiving access to said at least one resource on said first server through said second server if said authenticating is unsuccessful.

28. The system of claim 27, wherein said client is an application.

29. The system of claim 28, wherein said receiving access through said second server comprises:
   said application submitting said request for access to said second server for said at least one resource on said first server;
   said second server forwarding said request for access to said first server;
   said second server receiving from said first server access to said at least one resource;
   said second server forwarding to said application said access to said at least one resource on said first server.

30. The system of claim 28, wherein said second server comprises a servlet with access to said first server's resources.

31. The system of claim 28, wherein said application comprises an applet.

32. The system of claim 31, wherein said applet originates from said second server.

33. The system of claim 28, wherein said receiving access through said second server further comprises locating a servlet with access to said at least one resource of said first server.

34. The system of claim 33, further comprising said second server sending an error message to said application if said locating a servlet fails.

35. The system of claim 27, wherein said request for access is submitted using an NFS communication model.

36. The system of claim 27, wherein said request for access is submitted via the HTTP/HTTPS communication protocol.

37. The system of claim 30, further comprising said servlet modifying said application's scope of access to said at least one resource on said first server.

38. The system of claim 27, wherein said authenticating said request is successful if an application was retrieved from said first server.

39. The system of claim 30, wherein said servlet returns an error message to said application if said application is not authorized to access said at least one resource on said first server.

* * * * *